June 10, 1930.  A. S. CURTIS  1,762,160
MEANS FOR AND METHOD OF WAVE ANALYSIS
Filed Dec. 7, 1925
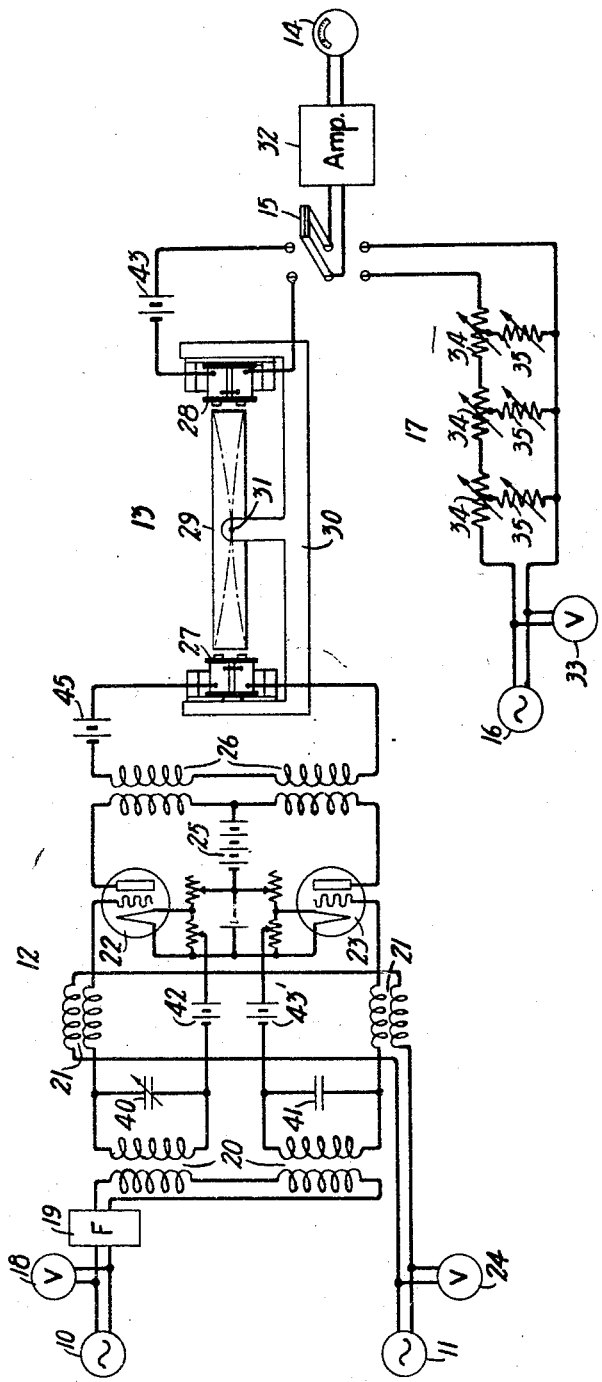
Inventor:
Alfred S. Curtis
by  E.W. Adams  Att'y.

Patented June 10, 1930

1,762,160

UNITED STATES PATENT OFFICE

ALFRED S. CURTIS, OF EAST ORANGE, NEW JERSEY, ASSIGNOR TO WESTERN ELECTRIC COMPANY, INCORPORATED, OF NEW YORK, N. Y., A CORPORATION OF NEW YORK

MEANS FOR AND METHOD OF WAVE ANALYSIS

Application filed December 7, 1925. Serial No. 73,951.

This invention relates to means for and the methods of wave analysis.

In measuring the transmission characteristics of electrical apparatus elements, such, for example, as speech or microphone transmitters, transmission lines, repeaters or other devices or circuits, it is necessary to know the character of the waves used in making the measurements. In many other instances also, it may be desirable to provide sources of waves, the characteristics of which are known. The distinguishing characteristics of waves which it is ordinarily necessary to know, are the voltage or amplitude and the frequency of the component elements of the wave.

The present invention provides an exceedingly simple and effective means for and method of wave analysis whereby the voltage or frequency or both of a sinusoidal wave or of the components of a complex wave may be readily determined. It is an object of the invention to provide a simple method of analysis of electric waves.

A further object is to determine the frequency and amplitude of electric waves.

Another object is to determine the frequency and amplitude of the components of a complex wave.

A feature of the invention is a wave analyzer comprising a modulator wherein known and unknown waves may be combined, and a fixed resonant element designed to respond to a component of a particular frequency of the modulated waves.

Another feature is a means, for determining the amplitude of components of unknown waves, which includes a source of waves of known voltage, an attenuation circuit and an indicating device.

The invention broadly comprises a source of waves of known frequency and a modulating device, wherein the wave of known frequency and wave to be analyzed may be modulated to produce a beat frequency wave; a fixed resonant element designed to respond to a wave of a predetermined frequency and an indicating device, supplied with the modulated or beat frequency wave. The resonant element is connected to the indicating device, by which it may be determined when the modulated wave includes a component having a frequency corresponding to the resonant frequency of the fixed resonant element.

The indicating device is also adapted to be connected to a circuit including a source of waves, a voltmeter, and a variable attenuator from which waves of known voltage may be derived for determining, by comparison, the voltage of the wave component supplied by the resonant device.

The invention is illustrated in the figure of the drawings.

The system shown on the drawings comprises a source 10 of complex waves to be analyzed and a variable source 11 of waves of known frequency. Sources 10 and 11 are coupled to the push-pull modulator 12 which is adapted to supply modulated waves to a resonant element 13 which may be connected to an indicating device 14 by means of a switch 15. By means of the switch 15, a source of waves 16, the voltage of which may be determined by voltmeter 33, may also be connected through the variable attenuation circuit 17 to the indicating device 14.

The output terminals of the source of waves 10 are connected to a voltage measuring device 18 and a low pass filter 19 designed to transmit waves within a predetermined band of frequencies to the primary windings of transformer 20 and to exclude waves outside the desired band.

The secondary windings of transformer 20 are included in the respective input circuits of space discharge tubes 22 and 23 connected to their control electrodes and cathodes. Adjustable condenser 40 and fixed condenser 41 are connected respectively in shunt to the secondary windings of transformer 20. Adjustable condenser 40 enables the input circuits of tubes 22 and 23 to be balanced with respect to the primary winding of transformer 20.

The respective input circuits include the secondary windings of transformer 21, the primary windings of which are connected in series to the output terminals of the source 11. There is included also in the input circuits the batteries 42 and 43' for supplying suitable average potentials to the control electrodes of tubes 22 and 23. The potential of these batteries is preferably such as to reduce the amplitudes of the third and higher order modulation products.

A suitable voltmeter 24 is connected to the terminals of the source 11 for measuring the voltage of the waves supplied therefrom to the modulator 12.

The tubes 22 and 23 are connected in the well-known push pull arrangement and the common portion of their anode circuits includes the space current battery 25, whereas the individual portions of these circuits include the respective primary windings of output transformer 26. The secondary winding of this transformer is connected in series with the winding of an electromagnet 27 of the resonant device 13.

The device 13 also includes a second electromagnet 28 and a vibratory member 29 of magnetic material. The cores of magnets 27 and 28 are permanently magnetized and mounted upon a base 30 and are positioned with their poles closely adjacent to the opposite ends of the member 29. The latter is mounted upon the base 30, so as to be free to vibrate, by a pin 31 at its central point. The windings of magnet 28 are connected to a source of current 43 and to the terminals of the switch 15 by means of which they may be connected to the input circuit of an amplifier 32 of any well-known type, but preferably including one or more space discharge tubes. The indicating device 14 is connected so as to be supplied with waves from the output circuit of the amplifier 32.

The adjustable attenuation circuit 17 associated with the source 16 is connected to other terminals of the switch 15 so that the source 16 may be connected to the amplifier 32 and indicating device 14 in place of the magnet 28.

In the operation of the system of this invention waves from sources 10 and 11 are supplied to the input circuits of tubes 22 and 23. In a manner well understood the waves from source 10 modulate the waves from source 11.

The filter 19 functions to transmit a band of waves from source 10 below a predetermined frequency. In other words, this filter limits the maximum frequency which may be supplied from the source 10 to the modulator 12.

Magnet 27 of the resonant element 13 is supplied with modulated waves from the output circuit of modulator 12. These waves, as is well-known, include components represented both by the sum and difference of the waves from sources 10 and 11 together with other components including the original frequencies of the sources. The bar 29 of the resonant element 13 is designed to vibrate under the action of the varying field of magnet 27 at a predetermined frequency so that it responds only when the modulated wave contains a component having this predetermined frequency. The vibration of the bar 29 before the poles of the magnet 28 generates in the windings of this magnet a varying electromotive force which is supplied through switch 15 to the amplifier 32 whereby a correspondingly varying electromotive force of increased amplitude is supplied to the indicating device 14 which is actuated in proportion to the effective value thereof.

Since the frequency of the waves supplied from source 11 is known and the frequency to which the resonant element 13 responds is known, the frequency of the component of waves from source 10 causing the resonant element 13 to vibrate may be readily determined. By varying the frequency of source 11 over the proper range, the frequency of all of the components from source 10 which are transmitted by filter 19 may be determined.

As a specific example, the filter F may be adapted to transmit waves within a range of 0–5000 cycles per second, source 11 may be varied over a range of frequencies extending from 11050 cycles per second to 16000 cycles per second, and the resonant element 13 may be designed to respond substantially only to waves having a frequency of 11000 cycles per second. In this case, the frequency from source 11 which is varied over the range from 11050 cycles to 16000 cycles enables an analysis of the waves from source 10 to extend over the range of 50 cycles to 5000 cycles. It is desirable that the resonant element 13 should be designed to select a frequency at least twice that of the component of maximum frequency included in the waves supplied from the unknown source 10 to exclude the second harmonic of any component from this source.

By providing a variable source of known waves 11 and by providing a fixed resonant element the difficulties attendant upon the use of an adjustable resonant element are avoided. It is, of course, clear that an electrically resonant circuit or a piezo electric device or any other suitable resonant element may be substituted for the device 13.

When an electrically resonant circuit is provided, this invention has the advantage that no variation of capacity or inductance is necessary because the circuit is always operated at the same frequency. By virtue of this fact the resolving power of the analyzer in cycles per second is constant for all frequencies and does not depend upon the frequency characteristics or the effective resistance of the tuned circuit as would be the case if the tuning of this circuit were adjusted to select different frequencies.

When an indication of the amplitude of waves of a particular frequency has been produced by the device 14, this indication may be translated into an indication of the voltage or amplitude of the component of that frequency by connecting the indicating device to the source 16 which may be accomplished by operating switch 15. The voltage of waves from the source 16 may be determined by reading the voltmeter 33 and the voltage of the waves supplied to the indicating device 14 may be adjusted to a known value by means of the adjustable attenuation circuit 17. Consequently, by varying the attenuation until a reading upon the indicating device 14 corresponding to that obtained for unknown waves is secured, the voltage produced in this circuit by the unknown wave may be determined.

Although the invention has been described in connection with a particular circuit arrangement and combination of elements, it is to be understood that the particular circuit and elements illustrated may be modified or may be replaced by other elements and modifications without departing from the principles of applicant's invention which is to be limited only as indicated by the scope of the appended claims.

What is claimed is:

1. In a wave analyzing system, a source of waves to be analyzed lying within a definite portion of the frequency spectrum, a source of known frequency waves, a modulator supplied with waves from said sources, a fixed resonant element supplied with waves from said modulator, said element responding to a frequency higher than any within said portion of the frequency spectrum and an indicating device connected to said resonant element.

2. In a wave analyzing system to be analyzed, a source of unknown waves, a low pass filter connected to said source, a variable source of known frequency waves, means for combining waves from said two sources to produce side band components, a fixed resonant element adapted to respond to a predetermined frequecy supplied with said side band components, and an indicating device connected to said resonant element.

3. In a wave analyzing system, a source of complex waves of unknown frequency, a low pass filter connected to said source, a modulator adapted to be supplied with waves transmitted by said filter, means for supplying carrier waves of known frequency to said modulator whereby said carrier waves are modulated by said unknown frequency waves, a resonant device comprising input and output elements, and a vibratory bar actuated by said input element and adapted to influence said output element, and an indicating device connected to said output element, said input element being connected to said modulator and adapted to receive modulated waves therefrom.

4. The method of wave analysis which comprises combining a wave of unknown frequency with a wave of known frequency to produce beat frequency waves, selecting a component of the beat frequency wave of known frequency, causing said wave to produce a sensible indication, and comparing this indication with the indication produced by a wave of known amplitude.

5. The method of wave analysis which comprises modulating a carrier wave of known frequency by a wave including components of unknown frequency, varying the frequency of said carrier wave to obtain a predetermined known beat frequency with each of said components, selecting said predetermined frequency and causing said selected wave to produce an indication and comparing this indication with the indication produced by a wave of known amplitude.

6. The method of analysis of a complex wave which comprises modulating a carrier wave of known frequency with a complex wave including components of unknown frequency lying within a band, successively varying the frequency of said carrier wave to obtain waves of a predetermined known beat frequency by interaction with different components of said complex wave, selecting said waves of predetermined frequency, causing said selected waves to produce an indication and comparing said indication with the indication produced by a wave of known amplitude.

7. The method of wave analysis which comprises combining a wave of unknown frequency lying within a definite portion of the frequency spectrum with a wave of known frequency to produce beat frequency waves, selecting a component of the beat frequency wave of higher frequency than said wave of unknown frequency, and causing said component to produce an indication.

8. The method of analysis of a complex wave which comprises modulating a carrier wave of known frequency with a complex wave including components of unknown frequency, successively varying the frequency of said carrier wave to obtain a wave of a predetermined beat frequency with different components of said complex wave, said beat frequency wave being of higher frequency than any component of said complex wave, and causing said beat frequency wave to produce an indication.

9. The method of analysis of a complex wave which comprises modulating a carrier wave of known frequency with a complex wave including components of unknown frequency lying within a band, successively varying the frequency of said carrier wave to obtain beat frequency waves of a predetermined frequency, higher than the upper limit of said band, selecting said waves of predetermined frequency and causing said selected waves to produce an indication.

In witness whereof, I hereunto subscribe my name this 1st day of December, A. D. 1925.

ALFRED S. CURTIS.